US012595386B2

(12) United States Patent
Hayashi et al.

(10) Patent No.: US 12,595,386 B2
(45) Date of Patent: Apr. 7, 2026

(54) AQUEOUS INK, INK CARTRIDGE AND INK JET RECORDING METHOD

(71) Applicant: CANON KABUSHIKI KAISHA, Tokyo (JP)

(72) Inventors: Katsuhiro Hayashi, Kanagawa (JP); Keiichi Ito, Kanagawa (JP); Tsuyoshi Furuse, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 18/071,666

(22) Filed: Nov. 30, 2022

(65) Prior Publication Data

US 2023/0174802 A1     Jun. 8, 2023

(30) Foreign Application Priority Data

Dec. 7, 2021    (JP) ................................. 2021-198803
Oct. 24, 2022    (JP) ................................. 2022-169856

(51) Int. Cl.
*C09D 11/32*          (2014.01)
*B41J 2/01*           (2006.01)
(Continued)

(52) U.S. Cl.
CPC ................. *C09D 11/32* (2013.01); *B41J 2/01* (2013.01); *B41J 2/2107* (2013.01); (Continued)

(58) Field of Classification Search
CPC ... B41J 2/01; B41J 2/211; B41J 2/1433; B41J 2/17; B41J 2/17593; B41J 2/2107; (Continued)

(56) References Cited

U.S. PATENT DOCUMENTS 7,977,409 B2    7/2011    Nishiguchi
8,425,027 B2    4/2013    Nishiwaki
(Continued)

FOREIGN PATENT DOCUMENTS

JP          2014125555 A  *  7/2014  ............ C09D 11/00
JP          2020071387 A    5/2020
JP          2020147647 A    9/2020

OTHER PUBLICATIONS

European Search Report issued in corresponding European Application No. 22207837.0 dated Mar. 30, 2023.
(Continued)

*Primary Examiner* — Manish S Shah
(74) *Attorney, Agent, or Firm* — Venable LLP

(57)          ABSTRACT
Provided is an aqueous ink for ink jet containing coloring material-particle and resin particle. The resin particle is formed from a crystalline polyester resin having carboxylic acid groups. A difference between a 50% cumulative particle diameter ($D_{50C}$) in a volume-based particle size distribution of the coloring material-particle and a 50% cumulative particle diameter ($D_{50R}$) in a volume-based particle size distribution of the resin particle ($D_{50C}$–$D_{50R}$) is 10 nm or more. In addition, an ink cartridge and an ink jet recording method using this aqueous ink are provided.

13 Claims, 2 Drawing Sheets

(51) Int. Cl.
     *B41J 2/21*      (2006.01)
     *C09D 11/104*    (2014.01)
     *C09D 11/322*    (2014.01)
     *C09D 11/326*    (2014.01)

(52) U.S. Cl.
     CPC .......... *C09D 11/104* (2013.01); *C09D 11/322*
                   (2013.01); *C09D 11/326* (2013.01)

(58) Field of Classification Search
     CPC ...... B41J 2/1755; B41J 2/2114; B41J 2/2117;
               B41J 2/2056; B41J 2/21; B41J 2/0057;
               B41J 3/60; B41J 2002/012; B41J
               2/04598; B41J 2/04588; B41J 2/04595;
               B41J 2/04586; B41J 2/14274; B41J
               2/1623; B41J 2202/00; B41J 2202/03;
               B41J 2/14201; B41J 2/045; B41J
               11/0015; B41J 11/002; B41J 2/04581;
               B41J 2/055; B41J 2/16538; B41J
               2002/16502; B41J 29/02; B41J 2/17513;
               B41J 2/17509; B41J 29/13; B41J
               2/17553; B41J 2/1606; B41J 2/1642;
               B41J 2/1609; B41J 2/164; B41J 2/162;
               B41J 2/161; B41J 2/19; B41J 15/04;
               B41M 5/0011; B41M 5/0017; B41M
               5/0023; B41M 5/0047; B41M 7/00;
               B41M 7/0072; B41M 5/52; B41M
               5/5218; B41M 5/5227; C09D 11/36;
               C09D 11/40; C09D 11/30; C09D 11/38;
               C09D 11/32; C09D 11/322; C09D
               11/324; C09D 11/328; C09D 11/101;
               C09D 11/102; C09D 11/005; C09D
               11/54; C09D 11/52; C09D 11/106; C09D
               11/326; C09D 11/107; C09D 11/03;
               C09D 11/037; C09D 11/033
     See application file for complete search history.

(56)                References Cited

U.S. PATENT DOCUMENTS

| | | | |
|---|---|---|---|
| 8,889,763 B2 | 11/2014 | Hayashi | |
| 9,260,611 B2 | 2/2016 | Hayashi | |
| 9,365,733 B2 | 6/2016 | Hayashi | |
| 10,131,806 B2 | 11/2018 | Hayashi | |
| 11,072,720 B2 | 7/2021 | Furuse | |
| 2007/0213428 A1* | 9/2007 | Hiraishi | C09D 11/322 523/160 |
| 2011/0152442 A1* | 6/2011 | Doi | C09D 11/32 524/524 |
| 2012/0105558 A1* | 5/2012 | Li | C09D 11/326 347/100 |
| 2014/0066550 A1* | 3/2014 | Shigemori | C09D 11/322 524/190 |
| 2015/0044602 A1 | 2/2015 | Kitagawa | |
| 2015/0337149 A1* | 11/2015 | Wakabayashi | C09D 11/322 347/20 |
| 2015/0344713 A1* | 12/2015 | Mizushima | B41J 2/2107 347/100 |
| 2016/0130453 A1* | 5/2016 | Eguchi | B41J 2/2107 524/523 |
| 2018/0142110 A1* | 5/2018 | Maeda | B41J 2/01 |
| 2019/0270898 A1* | 9/2019 | Maeda | B41J 2/01 |
| 2021/0292577 A1 | 9/2021 | Hayashi | |

OTHER PUBLICATIONS

European Office Action issued in corresponding European Application No. 22207837.0 dated Jul. 18, 2025.

* cited by examiner

AQUEOUS INK, INK CARTRIDGE AND INK JET RECORDING METHOD

BACKGROUND OF THE INVENTION

Technical Field

The present invention relates to an aqueous ink, an ink cartridge and an ink jet recording method.

Background Art

Ink jet recording apparatuses have been heretofore widely used as compact printers for home use and have also been recently developed for office use and commercial printing. In the fields of office, commercial printing and the like, ink jet recording apparatuses are required to have an ability to record images with higher rubbing resistance than that of compact printers for home use.

For example, as an ink that may improve the fixability of a colorant to a recording medium, an aqueous ink for ink jet containing polyester-based resin particle has been proposed (Japanese Patent Application Laid-Open No. 2014-125555).

SUMMARY OF THE INVENTION

According to the present invention, provided is an aqueous ink for ink jet containing coloring material-particle and resin particle, in which the resin particle is formed from a crystalline polyester resin having carboxylic acid groups and a difference between a 50% cumulative particle diameter ($D_{50C}$) in a volume-based particle size distribution of the coloring material-particle and a 50% cumulative particle diameter ($D_{50R}$) in a volume-based particle size distribution of the resin particle ($D_{50C}$–$D_{50R}$) is 10 nm or more.

Further features of the present invention will become apparent from the following description of exemplary embodiments with reference to the attached drawings.

BRIEF DESCRIPTION OF THE DRAWINGS

FIG. 2A is a perspective view of a main portion of the ink jet recording apparatus and FIG. 2B is a perspective view of a head cartridge.

DESCRIPTION OF THE EMBODIMENTS

Figure 1:
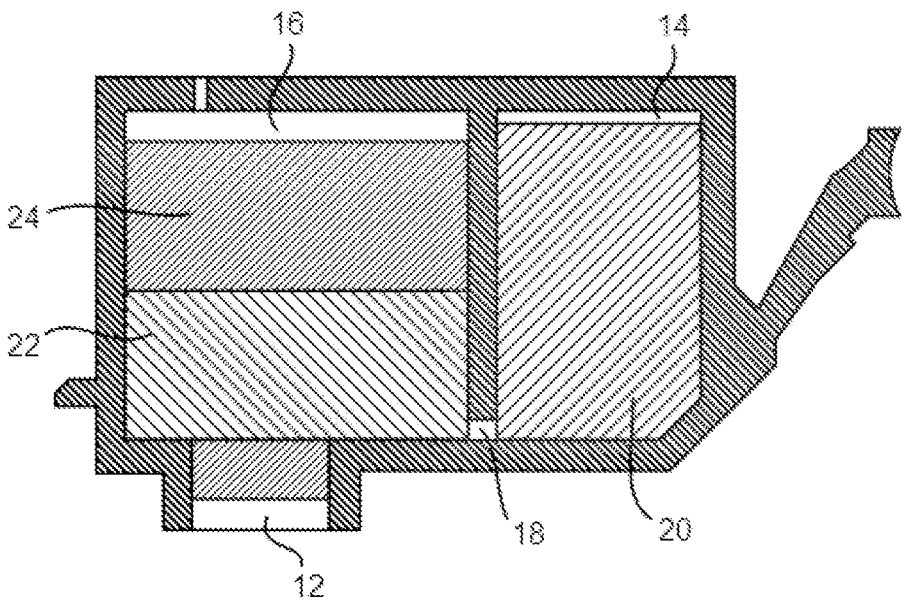
FIG. 1 is a cross-sectional view schematically illustrating an embodiment of an ink cartridge of the present invention.

The present inventors have studied the aqueous ink proposed in Japanese Patent Application Laid-Open No. 2014-125555. As a result, the present inventors have found that the aqueous ink has difficulty in recording an image having both chemical resistance, typified by alcohol-rubbing resistance, and image clarity at the levels required in recent years. The chemical resistance (alcohol-rubbing resistance) means a property which is resistant to solvent marks and peeling on an image even under sever conditions such as conditions where an external force is applied to an area in the image smeared with a solvent capable of dissolving an image layer or a recording medium. Meanwhile, the image clarity means a property which serves as an index indicating the distinctness of an object when the object is projected onto an image.

The projected object looks blurry when the image clarity is low or looks distinct when the image clarity is high.

Therefore, an object of the present invention is to provide an aqueous ink for ink jet capable of recording an image excellent in the chemical resistance and the image clarity. Another object of the present invention is to provide an ink cartridge and an ink jet recording method using the above aqueous ink.

Specifically, according to the present invention, provided is an aqueous ink for ink jet containing coloring material-particle and resin particle, in which the resin particle is formed from a crystalline polyester resin having carboxylic acid groups and a difference between a 50% cumulative particle diameter ($D_{50C}$) in a volume-based particle size distribution of the coloring material-particle and a 50% cumulative particle diameter ($D_{50R}$) in a volume-based particle size distribution of the resin particle ($D_{50C}$–$D_{50R}$) is 10 nm or more.

Hereinafter, the present invention will be described in details by using preferred embodiments. In the present invention, although, when a compound is a salt, the salt present in an ink is ionized, such state will be expressed as "the salt is contained" for convenience. In addition, an aqueous ink for ink jet will be also simply referred to as an "ink". Unless otherwise specified, the physical properties are the values at normal temperature (25° C.), normal pressure (1 atm=101,325 Pa) and normal humidity (relative humidity of 50%). In addition, "unit" means a unit structure corresponding to one monomer, unless otherwise specified. Then, the expressions of "(meth)acrylic acid" and "(meth)acrylate" mean "acrylic acid, methacrylic acid" and "acrylate, methacrylate" respectively.

In order to improve the chemical resistance of an image such as the alcohol-rubbing resistance, the present inventors have studied an ink containing resin particle formed from a crystalline polyester resin having carboxylic acid groups (hereinafter also simply referred to as "resin particle"). A polyester resin having carboxylic acid groups is presumed to form a strong film on a recording medium because molecular chains of the resin are entangled by hydrogen bonding between the carboxylic acid groups. Furthermore, it is considered that, when an ink containing resin particle formed from a crystalline polyester resin is applied to a recording medium, the crystalline polyester resin molecules in multiple resin particles adjoin to each other to grow the crystal structure. It is considered that a polyester resin film is formed by the polyester resin molecules closely adjoined owing to the formed crystal structure, and exhibits the chemical resistance by suppressing the permeation of a chemical such as alcohol into the image layer.

However, as a result of the study, it has been found that the use of the resin particle formed from a crystalline polyester resin having carboxylic acid groups sometimes did not lead to improvement of the chemical resistance of a recorded image. In addition, it has been found that the surface of an image tends to become uneven along with the growth of the crystal structure of the crystalline polyester resin and accordingly the image clarity of the image decreases. As a result of further study, the present inventors have found that the chemical resistance of an image can be improved without deteriorating the image clarity when the following requirements (i) and (ii) are satisfied, and have completed the present invention.

(i) Coloring material-particle and resin particle formed from a crystalline polyester resin having carboxylic acid groups are contained.

(ii) A difference between a 50% cumulative particle diameter ($D_{50C}$) in a volume-based particle size distribution of the coloring material-particle and a 50% cumulative particle diameter ($D_{50R}$) in a volume-based particle size distribution of the resin particle ($D_{50C}$–$D_{50R}$) is 10 nm or more.

Both of the coloring material-particle and the resin particle continuously undergo Brownian motion in ink droplets. The range of motion of particle depends on its particle diameter, and the smaller the particle diameter, the wider the range of motion. Therefore, the existence probability of smaller particle increases near the surfaces of ink droplets applied to the recording medium. If the above (ii) requirement is satisfied, a larger amount of resin particle exists near the surface of a recorded image after the liquid medium in the ink decreases by permeation or evaporation than in the inside of the image layer. Since the resin particle is formed from the crystalline polyester resin having carboxylic acid groups, the crystal structure is grown along with the adjoining of the crystalline polyester resin molecules in addition to the hydrogen bonding between the carboxylic acid groups, thereby forming a crystalline film near the surface of the image so as to cover the coloring material-particle. Since the crystalline film is formed with the crystalline polyester resin molecules densely arranged, the crystalline film is capable of suppressing the permeation of a chemical such as alcohol into the image layer and improves the chemical resistance of the image.

When "$D_{50C}$–$D_{50R}$" is less than 10 nm, the coloring material-particle is unevenly present near the surface of the image and allows a chemical such as alcohol to easily permeate the image layer, and the chemical resistance of the image is not improved. In addition, the resin particle is unevenly distributed near the surface of the image, and crystal growth tends to occur in an area where the resin particle exists in large amount. For this reason, the reflection state of light differs between the area where the resin particle exists in large amount and the area where the coloring material-particle exists in large amount, and accordingly the image clarity of the image is not improved.

<Ink>

An ink of the present invention is an aqueous ink for ink jet containing coloring material-particle and resin particle. Then, the resin particle is formed from a crystalline polyester resin having carboxylic acid groups. Hereinafter, components constituting the ink and physical properties of the ink in the present invention will be described in detail.

(Resin Particle)

The ink contains resin particle formed from a crystalline polyester resin having carboxylic acid groups (hereinafter also simply referred to as "resin particle"). The resin particle exists in the ink in a state dispersed in the ink, in other words, in the form of a resin emulsion. As the resin particle, resin particle dispersed by the action of the carboxylic acid groups included in the resin particle (self-dispersible type) is preferable rather than resin particle dispersed by a component such as a surfactant or resin (emulsification type). The resin particle does not need to contain a colorant. A percentage (% by mass) of the crystalline polyester resin in the resin forming the resin particle is preferably 50.00% by mass or more and more preferably 100.00% by mass, based on the total mass of the resin. In sum, it is preferable that the resin particle be substantially formed from only the crystalline polyester resin particle. The content (% by mass) of the resin particle in the ink is preferably 0.01% by mass or more to 10.00% by mass or less and more preferably 0.02% by mass or more to 5.00% by mass or less with respect to the total mass of the ink.

In the present invention, the "resin particle" means a resin existing in a state not dissolved in an aqueous medium constituting the ink. More specifically, the resin particle means a resin that can exist in the aqueous medium while forming particle whose particle diameter can be measured by dynamic light scattering. Meanwhile, a "water-soluble resin" means a resin existing in a state dissolved in the aqueous medium constituting the ink. More specifically, the "water-soluble resin" means a resin that can exist in the aqueous medium without forming particle whose particle diameter can be measured by the dynamic light scattering. If the resin particle is expressed as being paired with "the water-soluble resin", the resin particle is referred to as "water-dispersible resin (water-insoluble resin)".

Whether a certain resin is "resin particle" or not can be judged in accordance with the following method. First, a liquid containing a resin to be judged is diluted with pure water to prepare a sample with a content of the resin of about 1.0%. Then, in the measurement of the particle diameter of the resin in the sample by the dynamic light scattering, if particle having a particle diameter is measured, the resin is judged as "resin particle" (that is, "water-dispersible resin"). On the other hand, if particle having a particle diameter is not measured, the resin is judged as not "resin particle" (that is, "water-soluble resin"). The measurement conditions in the above judgment may be, for example, SetZero: 30 seconds, the number of measurements: 10, a measurement time: 120 seconds, a shape: spherical, a refractive index: 1.5, and a density: 1.0.

As a particle size distribution analyzer, a particle size analyzer using dynamic light scattering (for example, product name "Nanotrack WAVEII-Q" manufactured by Microtrack Bell) or the like can be used. Needless to say, the particle size distribution analyzer and the measurement conditions used are not limited to the above ones.

As for a resin other than the crystalline polyester resin (another resin such as a resin dispersant), whether the resin is resin particle or not is also defined as in the case of the above. Whether the other resin is resin particle or water-soluble resin can be judged in the same method as the above. However, in order to make judgment simply, the other resin may be judged by using a liquid containing the resin neutralized with an alkali (such as sodium hydroxide or potassium hydroxide) equivalent to the acid value of the resin (a content of the resin: 10% by mass) or using a liquid in which the above liquid is diluted as appropriate.

{Crystalline Polyester Resin}

The crystalline polyester resin forming resin particle contains carboxylic acid groups. In other words, the crystalline polyester resin is a resin having units each including a carboxylic acid group. An unreacted hydroxy group or carboxylic acid group exists at an end of the crystalline polyester resin. When no carboxylic acid group exists at the end of the crystalline polyester resin, a carboxylic acid group exists at a portion other than the end. The chemical resistance of an image recorded can be improved by using interaction between the carboxylic acid groups in the crystalline polyester resin.

Polyester resins are roughly classified into crystalline polyester resins and amorphous polyester resins. The crystalline polyester resin is a polyester resin having a melting point. The melting point of the polyester resin means a melting peak temperature (temperature at endothermic peak due to melting) measured by differential scanning calorimetry (DSC) in accordance with JIS K 7121: 1987. In the present invention, when the endothermic value obtained from the integrated value of the peak is 20 J/g or more, it is judged that a melting peak exists (that is, the resin is a crystalline polyester resin).

The polyester resin is usually composed of a unit derived from a polyhydric alcohol and a unit derived from a poly-carboxylic acid. A structure including an ester bond (—COO—) composed of a unit derived from a polyhydric alcohol and a unit derived from a polycarboxylic acid is also referred to as an "ester unit".

[Polyhydric Alcohol]

As a polyhydric alcohol to form a unit which is derived from the polyhydric alcohol and which constitutes the crystalline polyester resin by reaction, there are di- to tetrahydric alcohols. The polyhydric alcohols include poly-hydric alcohols having an aliphatic group, polyhydric alco-hols having an aromatic group, sugar alcohols and the like. The polyhydric alcohols include: dihydric alcohols such as ethylene glycol(1,2-ethanediol), neopentyl glycol(2,2-dim-ethyl-1,3-propanediol), 1,3-propanediol, 1,4-butanediol, benzene diol, 2,2-bis(4-hydroxyphenyl)propane(bisphenol A); trihydric alcohols such as glycerin, trimethylolethane and trimethylolpropane; tetrahydric alcohols such as pen-taerythritol; and the like. As the polyhydric alcohol, an oligomer (a low-molecular polymer having a molecular weight of 1,000 or less) can be used.

As the polyhydric alcohol, it is preferable to use one whose hydrocarbon portion is saturated. The resin particle formed from a polyester resin synthesized using a polyhy-dric alcohol whose hydrocarbon portion is unsaturated (re-ferred to as an unsaturated polyhydric alcohol in some cases) has a large refractive index and may decrease the image clarity of an image to some extent. A percentage of units derived from the unsaturated polyhydric alcohol among units which are derived from the polyhydric alcohol and which constitute the crystalline polyester resin is preferably 50 mol % or less, preferably 10 mol % or less and particu-larly preferably 0 mol %.

As the polyhydric alcohol, polyhydric alcohols having an aliphatic group can be preferably used. Among them, those having 4 or more carbon atoms are preferable and those having 6 or more carbon atoms are more preferable, or those having 12 or less carbon atoms are preferable and those having 8 or less carbon atoms are more preferable. More-over, a polyhydric alcohol having a linear hydrocarbon portion is preferable. A polyhydric alcohol having hydroxy groups at both ends of the hydrocarbon chain is preferable. It is preferable to use a dihydric or trihydric alcohol because it makes it easy to adjust the weight average molecular weight of the polyester resin. In particular, use of a dihydric alcohol is preferable. The use of any of polyhydric alcohols having a linear aliphatic group among them is preferable because the crystallinity of the crystalline polyester resin is further improved and the chemical resistance of the image is further enhanced. Two or more polyhydric alcohols, includ-ing a polyhydric alcohol having a linear aliphatic group, can also be used in combination. Specifically, a percentage of units derived from a polyhydric alcohol having the afore-mentioned preferable aliphatic group among units which are derived from polyhydric alcohols having aliphatic groups and which constitute the crystalline polyester resin is pref-erably 50 mol % or more. Moreover, the above percentage of the units is more preferably 100 mol %.

[Polycarboxylic Acid]

As the polycarboxylic acid to form units which are derived from the polycarboxylic acid and which constitute the polyester resin by reaction, there are di- to tetracarbox-ylic acids. Regarding a structure of the polycarboxylic acid, there are a polycarboxylic acid having an aliphatic group, a polycarboxylic acid having an aromatic group, a nitrogen-containing polycarboxylic acid and the like. The polycar-boxylic acids include: dicarboxylic acids such as glutaric acid, adipic acid, terephthalic acid, isophthalic acid and 2,6-naphthalenedicarboxylic acid; tricarboxylic acids such as trimellitic acid; tetracarboxylic acids such as ethylenedi-aminetetraacetic acid; and the like. As the polycarboxylic acid, an oligomer (a low-molecular polymer having a molecular weight of 1,000 or less) can be used.

As the polycarboxylic acid, it is preferable to use one whose hydrocarbon portion is saturated. The resin particle formed from a polyester resin synthesized using a polycar-boxylic acid whose hydrocarbon portion is unsaturated (also referred to as an unsaturated polycarboxylic acid in some cases) have a large refractive index and may decrease the image clarity of an image to some extent. A percentage of units derived from the unsaturated polycarboxylic acid among units which are derived from the polycarboxylic acid and which constitute the crystalline polyester resin is pref-erably 50 mol % or less, preferably 10 mol % or less and particularly preferably 0 mol %.

As the polycarboxylic acid, polycarboxylic acids having an aliphatic group can be preferably used. Among them, those having 4 or more carbon atoms are preferable and those having 6 or more carbon atoms are more preferable, or those having 12 or less carbon atoms are preferable and those having 8 or less carbon atoms are more preferable. The above number of carbon atoms does not include a carbon atom constituting the carboxylic acid group. It is preferable to use one whose hydrocarbon portion is saturated. More-over, a polycarboxylic acid having a linear hydrocarbon portion is preferable. A polycarboxylic acid having carbox-ylic acid groups at both ends of the hydrocarbon chain is preferable. It is preferable to use a dicarboxylic or tricar-boxylic acid because it makes it easy to adjust the weight average molecular weight and the acid value of the polyester resin. In particular, use of any of dicarboxylic acids is preferable. The use of any of polycarboxylic acids having a linear aliphatic group among them is preferable because the crystallinity of the crystalline polyester resin is further improved and the chemical resistance of the image is further enhanced. Two or more polycarboxylic acids, including a polycarboxylic acid having a linear aliphatic group, can also be used in combination. Specifically, a percentage of units derived from a polycarboxylic acid having the aforemen-tioned preferable aliphatic group among units which are derived from polycarboxylic acids having aliphatic groups and which constitute the crystalline polyester resin is pref-erably 50 mol % or more. Moreover, the above percentage of the units is more preferably 100 mol %.

[Combination of Polyhydric Alcohol and Polycarboxylic Acid]

A polyester resin including a unit derived from a diol having hydroxy groups at both ends of a linear saturated hydrocarbon group and a unit derived from a dicarboxylic acid having carboxylic acids at both ends of a linear satu-rated hydrocarbon group is preferable. Such polyester resin tends to improve the crystallinity because the hydrocarbon groups of the diol and the dicarboxylic acid tend to interact with each other. A percentage of the total of units derived from the above diols and units derived from the above dicarboxylic acids in the total of units derived from poly-hydric alcohols and units derived from polycarboxylic acids, these units constituting the crystalline polyester resin, is preferably 50 mol % or more. Moreover, the above percentage is more preferably 70 mol % or more and even more preferably 100 mol %. Resin particle formed from a crystalline polyester resin in which the above percentage is high is capable of suppressing a decrease in the crystallinity due to hydration in the aqueous medium that constitutes the aqueous ink, thereby further improving the chemical resistance of a recorded image.

{Physical Properties of Resin Particle}

[Melting Point of Crystalline Polyester Resin]

The melting point of the crystalline polyester resin is preferably 50° C. or higher to 140° C. or lower. When the melting point is lower than 50° C., the resin particle may have difficulty in forming a crystalline film near the surface of an image because the resin particle does not remain near but flows from the surface of an image and flows down into gaps in the colorant. This may reduce the effect of improving the chemical resistance. On the other hand, when the melting point is higher than 140° C., the resin particles have difficulty in growing crystals even if the resin particles adjoin each other, and tend to scatter light with the shapes of the resin particles maintained as they are. This may reduce the effect of improving the image clarity. Here, the melting point of the crystalline polyester resin is defined as a "melting peak temperature" obtained by differential scanning calorimetry (DSC) in accordance with JIS K 7121: 1987. The melting point of the crystalline polyester resin is preferably 50° C. or higher to 100° C. or lower.

[Acid Value of Crystalline Polyester Resin]

The acid value of the crystalline polyester resin is preferably 10 mg KOH/g or more to 50 mg KOH/g or less. When the acid value is less than 10 mg KOH/g, multiple resin particles tend to agglomerate because the amount of carboxylic acid groups is somewhat small, and the agglomerated portion tends to scatter light, which may reduce the effect of improving the image clarity. On the other hand, when the acid value is more than 50 mg KOH/g, the hydrophilicity of the resin particle may be somewhat high because the amount of carboxylic acid groups is somewhat large. For this reason, the amount of carboxylic acid groups existing near the surface of an image may also increase and the permeation or evaporation of the liquid medium in the ink tends to delay, which may reduce the effect of improving the image clarity. The acid value of the crystalline polyester resin forming the resin particle is more preferably 15 mg KOH/g or more to 25 mg KOH/g or less. The acid value of the crystalline polyester resin can be measured by neutralization titration using a potential difference.

The acid value of a crystalline polyester resin can be adjusted with a ratio between a polyhydric alcohol and a polycarboxylic acid as raw materials. For example, in the case where a crystalline polyester resin is synthesized by using a diol and a dicarboxylic acid as raw materials and the diol and the dicarboxylic acid are used in equimolar amounts, there is a high possibility that the synthesized crystalline polyester resin has a hydroxy group at one end of its molecular chain and a carboxylic acid group at the other end. The acid value can be adjusted by changing the ratio of the amount of carboxylic acid groups (y mol) of the polycarboxylic acid to the amount of hydroxy groups (x mol) of the polyhydric alcohol. In other words, even if the amount of the polyhydric alcohol (x mol) is larger than the amount of the polycarboxylic acid (y mol) (y/x<1), it is possible to synthesize a crystalline polyester resin having carboxylic acid groups. From the viewpoint of ease of adjustment of the acid value, y/x is preferably 0.8 or more and preferably 1.4 or less.

[Weight Average Molecular Weight of Crystalline Polyester Resin]

The weight average molecular weight of the crystalline polyester resin is preferably 10,000 or more to 70,000 or less and more preferably 15,000 or more to 30,000 or less. The weight average molecular weight of the crystalline polyester resin is a polystyrene-equivalent value measured by gel permeation chromatography.

[Particle Diameter of Resin Particle]

A 50% cumulative particle diameter ($D_{50R}$) in a volume-based particle size distribution of the resin particle is preferably 5 nm or more to 30 nm or less. When $D_{50R}$ is less than 5 nm, a crystalline film formed near the surface of an image by the resin particle has such a small thickness that a chemical such as alcohol may easily permeate the image layer, which may reduce the effect of improving the chemical resistance of the image. On the other hand, when $D_{50R}$ is more than 30 nm, the resin particle may be piled up near the surface of an image and form particle large in appearance along with crystal growth. In this case, the resin particle tends to scatter light, which may reduce the effect of improving the image clarity. The 50% cumulative particle diameter ($D_{50R}$) in the volume-based particle size distribution of the resin particle is more preferably 15 nm or more to 25 nm or less. Moreover, a 90% cumulative particle diameter ($D_{90R}$) in the volume-based particle size distribution of the resin particle is preferably 10 nm or more to 60 nm or less.

The ratio of the 50% cumulative particle diameter ($D_{50R}$) in the volume-based particle size distribution of the resin particle to the 90% cumulative particle diameter ($D_{90R}$) in the volume-based particle size distribution of the resin particle is preferably 0.6 times or more. When the above ratio is less than 0.6 times, coarse particle tends to exist and scatter light, which may reduce the effect of improving the image clarity. The above ratio is preferably 0.8 times or less.

The 50% cumulative particle diameter ($D_{50R}$) and the 90% cumulative particle diameter ($D_{90R}$) in the volume-based particle size distribution of the resin particle means the particle diameters of 50% and 90%, respectively, integrated from the small particle diameter side with respect to the total volume of the particle measured in a particle diameter cumulative curve. Both of $D_{50R}$ and $D_{90R}$ of the resin particle can be measured by the dynamic light scattering under the same conditions as in the aforementioned method for judging whether "the resin is resin particle or not".

{Method for Producing Resin Particle}

The resin particle can be produced, for example, by granulating a synthesized crystalline polyester resin. The crystalline polyester resin can be synthesized by a reaction (esterification reaction) of a polyhydric alcohol and a polycarboxylic acid. The esterification reaction preferably uses an esterification catalyst. As the esterification catalyst, there are metal compounds such as a tin compound, a titanium compound, an antimony compound, and a germanium compound. The amount of the esterification catalyst is preferably 100 ppm or more to 5000 ppm or less based on the total amount of the polyhydric alcohol and the polycarboxylic acid. The molecular weight of the crystalline polyester resin to be obtained can be adjusted as needed by adding any of the polyhydric alcohol and the polycarboxylic acid to a reaction system to cause a transesterification reaction for breaking some of the ester bonds.

The crystalline polyester resin having carboxylic acid groups can be obtained by adjusting the amounts of the raw materials used in the esterification reaction so that the number of moles of carboxylic acid groups in the polycarboxylic acid can be greater than the number of moles of hydroxy groups in the polyhydric alcohol. Instead, the crystalline polyester resin having carboxylic acid groups can be also obtained by using a polycarboxylic acid in the transesterification reaction.

The esterification reaction is preferably caused in an atmosphere with inert gas such as nitrogen gas. The reaction temperature in the esterification reaction is preferably 180° C. or higher to 260° C. or lower. The reaction time in the esterification reaction is preferably 1 hour or longer to 5 hours or shorter.

During the esterification reaction, the esterification (dehydration condensation) reaction may be promoted by reducing the pressure in the reaction system and thereby discharging water produced by the reaction from the system. Under the reduced pressure, the reaction is carried out continuously from the esterification reaction in the atmosphere with inert gas such as nitrogen gas. The reaction temperature under the reduced pressure is preferably 220° C. or higher to 280° C. or lower. The reaction time under the reduced pressure is preferably 0.5 hours or longer to 5 hours or shorter and more preferably 1 hour or longer to 3 hours or shorter. The degree of reduced pressure (degree of vacuum) is preferably 1 Pa or more to 130 Pa or less and more preferably 1 Pa or more to 50 Pa or less. Here, when the degree of reduced pressure is too low, the reaction efficiency may decrease and the crystalline polyester resin obtained may have a low weight average molecular weight. For this reason, it is preferable to adjust the degree of reduced pressure depending on the reaction conditions. It is preferable to gradually reduce the pressure from the atmospheric pressure (101,325 Pa) to 130 Pa or less over a time period of about 0.1 to 3 hours.

The transesterification reaction is caused in order to adjust the molecular weight of the crystalline polyester resin to be obtained and mainly to cause the carboxylic acid group to exist at one end of the molecular chain by breaking some of the ester bonds with addition of any of the polyhydric alcohol and the polycarboxylic acid to the reaction system. From the viewpoint of the efficiency in obtaining the crystalline polyester resin having carboxylic acid groups, the polycarboxylic acid is preferably used to cause the transesterification reaction.

It is preferable that the synthesized crystalline polyester resin be first formed into an appropriate form by pressurization, pulverization and the like and then be used in the next step for granulation. The resin particle formed from the crystalline polyester resin is preferably turned into a dispersion liquid state in which the resin particle is dispersed in an aqueous liquid medium because the resin particle will be used as an constituent component of the aqueous ink. The aqueous liquid medium contains, as a main component, water such as deionized water, ion-exchanged water or distilled water and may also contain a water-soluble organic solvent if necessary. The content (% by mass) of the water in the aqueous liquid medium is preferably 50% by mass or more, and use of a liquid medium substantially not containing any water-soluble organic solvent (in other words, water) is also preferable.

As a method for forming the resin particle by granulating the crystalline polyester resin, for example, there are a dispersion method, a phase inversion (emulsification) method and the like. The dispersion method includes the following methods (1) and (2).

(1) A method for dispersing a crystalline polyester resin by adding, to an aqueous liquid medium, a solution obtained by dissolving the crystalline polyester resin into an organic solvent; and (2) A method for dispersing a crystalline polyester resin by adding the crystalline polyester resin to an organic solvent, further adding an aqueous liquid medium thereto, and mixing the resultant mixture.

As the phase inversion (emulsification) method, there is, for example, a method in which, in the course of phase inversion from a solvent system to an aqueous system by adding an aqueous liquid medium to a solution obtained by dissolving a polyester resin in an organic solvent, the polyester resin is deposited in the form of particle. In any of the methods, it is preferable that the particle diameter of the resin particle obtained be adjusted by granulation using a known dispersing machine and applying an appropriate shearing force.

The resin particle is preferably produced by the phase inversion (emulsification) method because the particle diameter of the resin particle obtained can be accurately adjusted. Hereinafter, a method for producing resin particle in a phase inversion (emulsification) method will be described.

First, a resin solution is obtained by dissolving a crystalline polyester resin into an organic solvent. As the organic solvent, there are ethers such as tetrahydrofuran and dibutyl ether; ketones such as methyl ethyl ketone; alcohols such as isopropanol; and the like. The sole use of an organic solvent (such as methyl ethyl ketone) which has low water-solubility and is not miscible with water at a given percentage may make it difficult to accurately adjust the particle diameter. For this reason, as the organic solvent, it is preferable to use ethers such as tetrahydrofuran which are miscible with water at a given percentage. The ethers such as tetrahydrofuran are also preferable from the viewpoint that the ability to dissolve a crystalline polyester resin is excellent.

In order to dissolve the crystalline polyester resin uniformly, the crystalline polyester resin is preferably dissolved in the organic solvent with heating. Here, the heating is performed to a temperature lower than the boiling point of the organic solvent where to dissolve the resin. If the concentration of the crystalline polyester resin in the resin solution is too low, it may be difficult to control the particle size distribution. Therefore, the content (% by mass) of the crystalline polyester resin in the resin solution is preferably 10.0% by mass or more to 60.0% by mass or less and more preferably 20.0% by mass or more to 40.0% by mass or less.

Next, the resin particle is deposited by gradually adding an aqueous liquid medium to the obtained resin solution. It is preferable to add a base before or during the addition of the aqueous liquid medium because the stable dispersion state of the resin particle can be maintained. As the base, hydroxides of alkali metals such as sodium hydroxide and potassium hydroxide, ammonia and the like can be used and any of them is added in the form of an aqueous solution preferably. The amount of the base to be added can be controlled with a neutralization rate (mol %) based on the acid value corresponding to all carboxylic acid groups in the crystalline polyester resin. The neutralization rate is preferably 70 mol % or more to 100 mol % or less. As the amount of the aqueous liquid medium added increases, the initially transparent resin solution becomes cloudy and emulsifies, thus forming resin particle. The particle diameter, particle size distribution and the like of the obtained resin particle can be controlled by adjusting the content of the crystalline polyester resin in the resin solution, the neutralization rate, the shearing force applied in the process of dispersion and the like.

The obtained emulsion is decompressed to remove the organic solvent. If necessary, the resultant is filtered through a filter (stainless mesh) or the like having an appropriate pore size to remove coarse particle. Then, water is added to adjust the content of the resin particle, so that a liquid containing the resin particle (aqueous dispersion of the resin particle) can be prepared. The water for use to adjust the content is preferably deionized water, ion-exchanged water or distilled water. From the viewpoint of the productivity of the ink, the content (% by mass) of the resin particle in the liquid containing the resin particle is preferably 5.0% by mass or more to 30.0% by mass or less and more preferably 15.0% by mass or more to 30.0% by mass or less.

{Composition Analysis of Resin Particle}

Whether or not the resin constituting the resin particle is a crystalline polyester resin can be judged, for example, by the following method. First, a sample is prepared by dissolving the resin particle in an organic solvent such as tetrahydrofuran which is capable of dissolving the resin particle. The resin particle used may be in an aqueous dispersion state or a dried state. The prepared sample is analyzed by nuclear magnetic resonance (NMR) spectroscopy, matrix-assisted laser desorption/ionization mass spectrometry (MALDI-MS) or the like. Thus, the kinds and percentages of units (monomers) constituting the resin can be identified. Instead, the resin particle may be directly analyzed by pyrolysis gas chromatography to detect the units (monomers) constituting the resin. If an insoluble matter that does not dissolve in the organic solvent is produced during sample preparation, the produced insoluble matter can be also analyzed by pyrolysis gas chromatography to detect the units (monomers) constituting the resin. In addition, the dried sample is subjected to differential scanning calorimetry (DSC) to confirm that a melting peak temperature (melting point) exists, so that the resin can be judged as crystalline.

(Coloring Material-Particle)

As a colorant of the ink, coloring material-particle that is a colorant in a particle form is used. A colorant such as a water-soluble dye that is soluble as molecules in an ink is much smaller in size than the resin particle. For this reason, a colorant in a non-particle form has a high existence probability near the surfaces of ink droplets and a larger amount of the colorant exists near the surface of a recorded image than in the inside of the image layer. The colorant in the non-particle form tends to dissolve in a chemical such as alcohol, so that the chemical resistance of an image cannot be obtained.

The coloring material-particle is coloring material-particle using a pigment or dye and is contained in the ink in a dispersed state as particle having a particle diameter. The content (% by mass) of the coloring material-particle in the ink based on the total mass of the ink is preferably 0.1% by mass or more to 15.0% by mass or less and is more preferably 1.0% by mass or more to 10.0% by mass or less.

Specific examples of the pigment include: inorganic pigments such as carbon black and titanium oxide; and organic pigments such as azo pigment; phthalocyanine pigment, perylene pigment, perinone pigment, quinacridone pigment, dioxazine pigment, diketopyrrolopyrrole pigment, quinophthalone pigment, isoindolinone pigment and imidazolone pigment.

As the coloring material-particle using the pigment, a resin-dispersed pigment using a resin as a dispersant, a self-dispersible pigment in which hydrophilic groups are bonded to the particle surface of the pigment or the like can be used. Further, a resin-bonded pigment in which organic groups containing a resin are chemically bonded to the particle surface of the pigment, a microcapsule pigment in which the particle surface of the pigment is coated with a material such as a resin or the like can be used. Among them, not the resin-bonded pigment or the microcapsule pigment, but the self-dispersible pigment or the resin-dispersed pigment in which a resin as a dispersant is physically adsorbed to the particle surface of the pigment is preferable for use and the resin-dispersed pigment is more preferable for use. As the dispersant for the resin-dispersed pigment, not a water-insoluble resin but a water-soluble resin is more preferable for use.

As the self-dispersible pigment, there is a pigment in which an anionic group is bonded to the particle surface of the pigment directly or via another group of atoms. As the anionic group, there are a carboxylic acid group, a sulfonic acid group, a phosphoric acid group, a phosphonic acid group and the like. As a counter ion for the anionic group, there are cations of hydrogen atom, alkali metals, ammonium, organic ammonium and the like. The other group of atoms is a group having a function as a spacer between the particle surface of the pigment and an ionic group and preferably has a molecular weight of 1,000 or less. As the other group of atoms, there are an alkylene group having about 1 to 6 carbon atoms, an arylene group such as a phenylene group or a naphthylene group, an ester group, an imino group, an amide group, a sulfonyl group, an ether group and the like. The other group of atoms may be a group including a combination of two or more of these groups.

As the resin dispersant for dispersing the pigment in an aqueous medium, it is preferable to use a resin capable of dispersing the pigment by an action of an anionic group. As the resin dispersant, there are acrylic resin, urethane resin and the like. Among them, an acrylic resin is preferable and an acrylic resin having a hydrophilic unit and a hydrophobic unit as structural units is more preferable. In particular, an acrylic resin having a hydrophilic unit derived from a (meth)acrylic acid and a hydrophobic unit derived from a monomer having an aliphatic group or aromatic group is preferable.

The hydrophilic unit is a unit having a hydrophilic group such as an anionic group, a hydroxy group and an ethylene oxide group. The hydrophilic unit can be formed, for example, by polymerizing hydrophilic group-containing monomers. Specific examples of the hydrophilic group-containing monomers include: carboxylic acid group-containing acidic monomers such as an (meth)acrylic acid; anionic monomers such as anhydrides and salts of these acidic monomers; hydroxy group-containing monomers such as 2-hydroxyethyl (meth)acrylate; ethylene oxide group-containing monomers such as methoxypolyethylene glycol (meth)acrylate; and the like. As the cations constituting the salts of the acidic monomers, there are ions of lithium, sodium, potassium, ammonium, organic ammonium and the like.

The hydrophobic unit is a unit not having a hydrophilic group such as an anionic group, a hydroxy group and an ethylene oxide group. The hydrophobic unit can be formed, for example, by polymerizing hydrophobic monomers containing no hydrophilic groups. Specific examples of the hydrophobic monomers include: aromatic group-containing monomers such as styrene, α-methylstyrene and benzyl (meth)acrylate; aliphatic group-containing monomers such as ethyl (meth)acrylate, methyl (meth)acrylate, (iso-)propyl (meth)acrylate, butyl (meth)acrylate and 2-ethylhexyl (meth)acrylate; and the like.

Specific examples of the dye include oil-soluble dyes, disperse dyes, reactive dyes, direct dyes, acid dyes, and basic dyes. Among them, the oil-soluble dyes, the disperse dyes and the basic dyes are preferable. A dye insoluble in an aqueous medium constituting the aqueous ink is suitably used as coloring material-particle in which the dye is used by being dispersed by a resin dispersant or dying the resin particle. As such a dye, the oil-soluble dyes, the disperse dyes and the basic dyes are also preferable. When a dye is used as a colorant, it is preferable to use resin particle dyed with the dye.

As the resin dispersant for dispersing the dye in the aqueous medium, any resin dispersant may be selected from the same resin dispersants as those listed for the pigment and be used. As resin particle dyed with a dye, an aqueous dispersion of resin particle dyed with a dye can be obtained by mixing and emulsifying a mixture in which the resin and the dye are dissolved in an organic solvent, water, and others, and then removing the organic solvent. Alternatively, an aqueous dispersion of resin particle dyed with a dye can be also obtained by adding the dye to an aqueous dispersion of the resin particle obtained by emulsion polymerization of various monomers, followed by heating and, if necessary, pressurization.

Whether or not the resin particle is dyed with the dye can be judged in accordance with the following method. Although a method for extracting and analyzing resin particle from an ink is described herein, resin particle extracted from an aqueous dispersion can be also analyzed in the same manner. First, resin particle is separated from an ink containing the resin particle by density gradient centrifugation. The density gradient centrifugation includes a density gradient sedimentation velocity method and a density gradient sedimentation equilibrium method. In the density gradient sedimentation velocity method, the resin particle can be separated and extracted by using a sedimentation coefficient difference. In the density gradient sedimentation equilibrium method, the resin particle can be separated and extracted by using a density difference. After a dispersion of the obtained resin particle is dried, a solution is prepared by using a dye, an additive and an organic solvent which is capable of dissolving the resin. The components in the prepared solution are separated by any of preparative gel permeation chromatography (GPC), preparative high performance liquid chromatography (HPLC), and column chromatography, so that the dye, the additive, the resin and others are collected. The dye, the additive and the resin thus collected are analyzed in an analytical method such as nuclear magnetic resonance (NMR) spectroscopy or matrix-assisted laser desorption/ionization mass spectrometry (MALDI-MS). In this way, the kinds of the dye and the additive and the kinds and percentages of structural units (monomers) of the resin can be identified. Moreover, the collected resin is analyzed by pyrolysis gas chromatography, so that the monomers produced by depolymerization can be also directly detected.

{Physical Properties of Coloring Material-Particle}
[Particle Diameter of Coloring Material-Particle]

A 50% cumulative particle diameter ($D_{50C}$) in a volume-based particle size distribution of the coloring material-particle is preferably 40 nm or more to 150 nm or less. When $D_{50C}$ is less than 40 nm, the coloring material-particle may be unevenly arranged near the surface of an image and allow a chemical to easily permeate the image layer, which may reduce the effect of improving the chemical resistance. On the other hand, when $D_{50C}$ is more than 150 nm, the unevenness derived from the coloring material-particle near the surface of an image may be somewhat conspicuous and tend to scatter light, which may reduce the effect of improving the image clarity of the image. The 50% cumulative particle diameter ($D_{50C}$) in the volume-based particle size distribution of the coloring material-particle is preferably 80 nm or more to 120 nm or less. $D_{50C}$ of the coloring material-particle can be measured by dynamic light scattering using a sample in which the content of the coloring material-particle is about 1.0% under the same conditions as in the aforementioned method for judging whether "the resin is resin particle or not".

[Particle Diameter Difference Between Coloring Material-Particle and Resin Particle]

A difference between the 50% cumulative particle diameter ($D_{50C}$) in the volume-based particle size distribution of the coloring material-particle and the 50% cumulative particle diameter ($D_{50R}$) in the volume-based particle size distribution of the resin particle is 10 nm or more. When "$D_{50C}-D_{50R}$" is 10 nm or more, the chemical resistance of an image can be improved without decreasing the image clarity. "$D_{50C}-D_{50R}$" is preferably 150 nm or less and more preferably 100 nm or less. When "$D_{50C}-D_{50R}$" is more than 150 nm, the resin particle may easily enter the gaps in the coloring material-particle formed by the ink applied to a recording medium and therefore be less arranged near the surface of the image. As a result, a chemical may easily permeate the image layer, which may reduce the effect of improving the chemical resistance of the image. In addition, the effect of improving the image clarity may be also reduced.

[Mass Ratio of Coloring Material-Particle and Resin Particle]

A mass ratio of the content (% by mass) of the coloring material-particle to the content (% by mass) of the resin particle in the ink is preferably 1.0 times or more to 100.0 times or less. When the above mass ratio is less than 1.0 times, the content of the resin particle is rather high, so that the resin particle tends to hinder the coloring material-particle from being fixed to a recording medium. For this reason, when a stress is applied together with a chemical to an image, the image may be easily separated from the recording medium. On the other hand, when the above mass ratio is more than 100.0 times, the content of the resin particle is rather low and accordingly the amount of the resin particle arranged near the surface of an image may be rather small. For this reason, a chemical may easily permeate the image layer, which may reduce the effect of improving the chemical resistance of the image.

(Aqueous Medium)

The ink of the present invention is an aqueous ink containing water or an aqueous medium that is a mixture solvent of water and a water-soluble organic solvent. As the water, it is preferable to use deionized water (ion-exchanged water). The content (% by mass) of the water in the ink is preferably 50.0% by mass or more to 95.0% by mass or less with respect to the total mass of the ink. As the water-soluble organic solvent, it is possible to use any solvent usable in an ink for ink jet such as alcohols, glycols, (poly)alkylene glycols, nitrogen-containing compounds and sulfur-containing compounds. The content (% by mass) of the water-soluble organic solvent in the ink is preferably 3.0% by mass or more to 50.0% by mass or less with respect to the total mass of the ink. When the content of the water-soluble organic solvent is above or below the aforementioned range, the reliability as the aqueous ink for ink jet such as anti-sticking property may be reduced.

(Other Components)

In addition to the aforementioned components, the ink may contain, if necessary, a water-soluble organic compound that is solid at 25° C., such as polyhydric alcohols such as trimethylolpropane and trimethylolethane, urea and urea derivatives such as ethyleneurea. Moreover, the ink may contain, if necessary, various additives such as a surfactant, a pH adjuster, a defoamer, a rust inhibitor, a preservative, a fungicide, an antioxidant, an anti-reduction agent and a chelating agent. When a surfactant is used, the content (% by mass) of the surfactant in the ink is preferably 0.1% by mass or more to 5.0% by mass or less and more preferably 0.1% by mass or more to 2.0% by mass or less with respect to the total mass of the ink.

The ink may further contain other resins in addition to the resin particle formed from the crystalline polyester resin. The other resins include a resin dispersant for dispersing the pigment and the like. As the other resins, water-soluble resins are preferably used. The forms of the water-soluble resins include a block copolymer, a random copolymer, a graft copolymer and a combination of two or more of these. As the water-soluble resins, there are acrylic resins, urethane resins, olefin resins and the like. Among them, the acrylic resins and the urethane resins are preferable.

(Physical Properties of Ink)

The ink of the present invention is an aqueous ink to be applied to an ink jet system. Therefore, from the viewpoint of the reliability, it is preferable to appropriately control physical properties of the ink. The viscosity at 25° C. of the ink is preferably 1.0 mPa·s or more to 10.0 mPa·s or less, more preferably 1.0 mPa·s or more to 5.0 mPa·s or less and particularly preferably 1.0 mPa·s or more to 3.0 mPa·s or less. Then, the surface tension at 25° C. of the ink is preferably 10 mN/m or more to 60 mN/m or less, more preferably 20 mN/m or more to 60 mN/m or less and particularly preferably 30 mN/m or more to 50 mN/m or less. The pH at 25° C. of the ink is preferably 5.0 or more to 10.0 or less and more preferably 7.0 or more to 9.5 or less.

<Ink Cartridge>

An ink cartridge of the present invention includes an ink and an ink storage portion for storing the ink. Then, the ink stored in the ink storage portion is the aqueous ink of the present invention described above. FIG. 1 is a cross-sectional view schematically illustrating an embodiment of an ink cartridge of the present invention. As illustrated in FIG. 1, an ink supply port 12 for supplying the ink to a recording head is provided in a bottom of the ink cartridge. The inside of the ink cartridge functions as the ink storage portion for storing the ink. The ink storage portion includes an ink storage chamber 14 and an absorber storage chamber 16 and these chambers 14 and 16 communicate with each other via a communication port 18. The absorber storage chamber 16 communicates with the ink supply port 12. The ink storage chamber 14 stores a liquid ink 20 and the absorber storage chamber 16 stores absorbers 22 and 24 which hold the ink in a state impregnated with the ink. The ink storage portion may have a structure which does not have an ink storage chamber and in which absorbers hold a total amount of stored ink. Instead, the ink storage portion may have a structure which does not have absorbers and stores the total amount of ink in a liquid state. Further, the ink cartridge may have a structure including an ink storage portion and a recording head.

<Ink Jet Recording Method>

The ink jet recording method of the present invention is a method for recording an image on a recording medium by ejecting the aforementioned aqueous ink of the present invention from an ink jet recording head. As a method for ejecting the ink, there are a method of applying mechanical energy to the ink and a method of applying thermal energy to the ink. In the present invention, it is particularly preferable to employ the method for ejecting an ink by applying thermal energy to the ink. The ink jet recording method may include known steps except that the ink of the present invention is used.

Figure 2A:
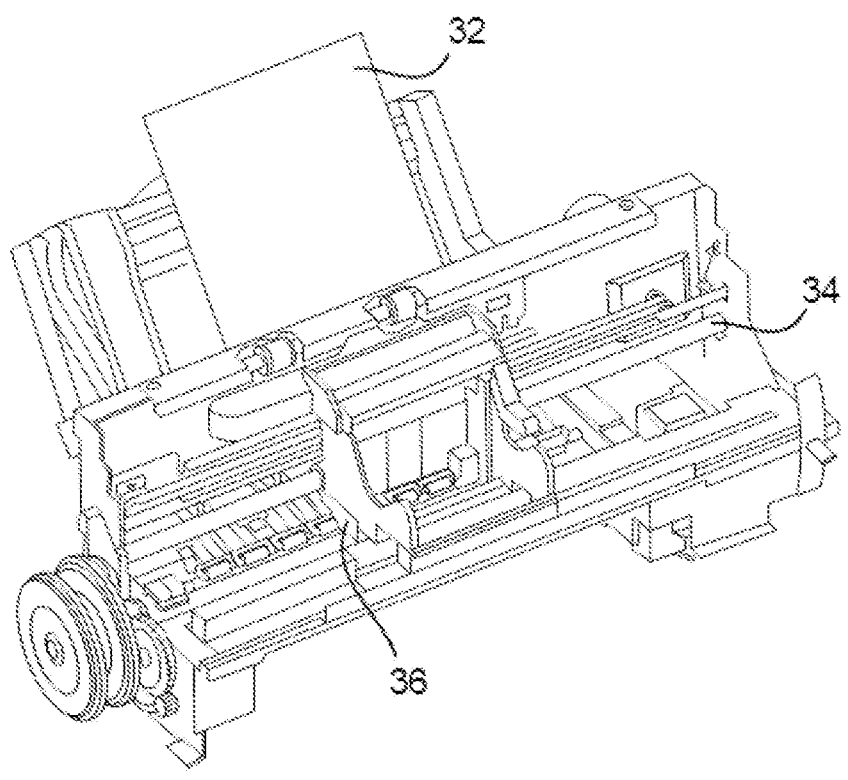
FIGS. 2A and 2B are views schematically illustrating an example of an ink jet recording apparatus used in an ink jet recording method of the present invention.
Figure 2B:
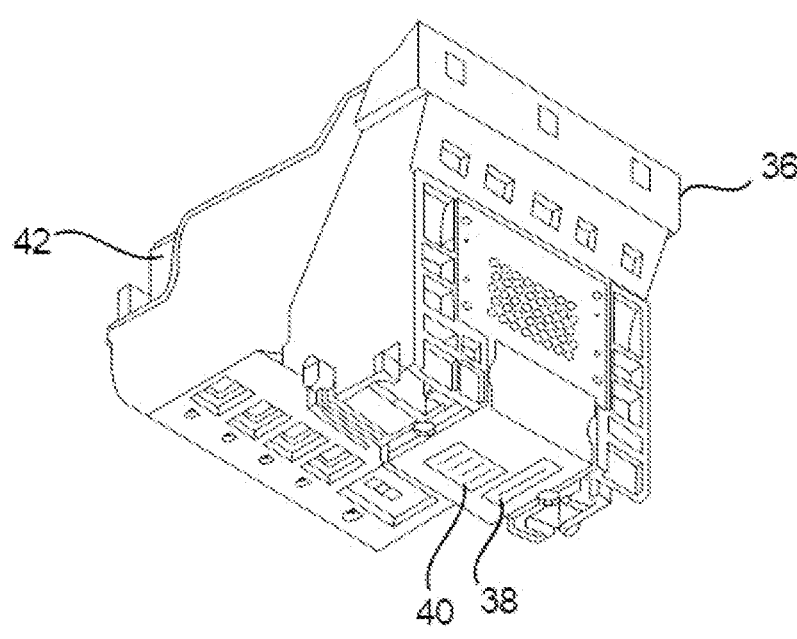

FIGS. 2A and 2B are views schematically illustrating an example of an ink jet recording apparatus used in the ink jet recording method of the present invention; FIG. 2A is a perspective view of a main portion of the ink jet recording apparatus and FIG. 2B is a perspective view of a head cartridge. The ink jet recording apparatus includes a transport unit (not illustrated) for transporting a recording medium 32 and a carriage shaft 34. A head cartridge 36 is mountable on the carriage shaft 34. The head cartridge 36 includes recording heads 38 and 40 and has a structure in which an ink cartridge 42 is set. While the head cartridge 36 is transported in a main-scanning direction, ink (not illustrated) is ejected to the recording medium 32 from the recording heads 38 and 40. Then, an image is recorded on the recording medium 32 while the recording medium 32 is transported in a sub-scanning direction by the transport unit (not illustrated).

As the recording medium on which recording is made by using the ink of the present invention, any recording medium may be used. It is possible to use recording media with ink absorbency such as recording media without a coat layer such as plain paper and recording media with a coat layer such as glossy paper and matte paper. In addition, it is also possible to use recording media with low or no ink absorbency, such as actual printing paper, coated paper, resin sheets and resin films. The ink of the present invention is suitably usable for application of recording an image by directly applying the ink onto such recording medium.

According to the present invention, it is possible to provide an aqueous ink for ink jet capable of recording an image excellent in the chemical resistance and the image clarity. In addition, according to the present invention, it is possible to provide an ink cartridge and an ink recording method using the above aqueous ink.

EXAMPLES

Hereinafter, the present invention will be described in more details by using Examples and Comparative Examples, but the present invention should not be limited to the following Examples without departing from the scope of the present invention. In the following description, "parts" and "%" for amounts of components are based on mass unless otherwise specified.

<Physical Property Measurement Method>

(Melting Point of Crystalline Polyester Resin)

A measurement sample was obtained by precipitating resin particle formed from a crystalline polyester resin by using a 1.0 mol/L hydrochloric acid aqueous solution, and thoroughly washing the resin particle with water, followed by drying at 60° C. The "melting point" was defined as a melting peak temperature measured in accordance with JIS K 7121: 1987 using a differential scanning calorimeter (product name "Q1000" manufactured by TA instruments). When an endothermic value obtained from the integrated value of a peak was 20 J/g or more, it was judged that a melting peak was obtained, and this melting peak temperature was determined as the "melting point".

(Acid Value of Crystalline Polyester Resin)

The resin particle formed from the crystalline polyester resin was precipitated by using a 1.0 mol/L hydrochloric acid aqueous solution, thoroughly washed with water and then dried at 60° C. After the obtained dried product was added to and dissolved in 50 mL of tetrahydrofuran at 50° C., the resultant mixture was cooled to room temperature with addition of 5 mL of water to obtain a measurement sample. The obtained measurement sample was subjected to neutralization titration to measure the acid value of the polyester resin. The neutralization titration used an automatic potentiometric titrator (product name: "AT510" manufactured by Kyoto Electronics Manufacturing Co., Ltd.) equipped with a combined glass electrode (product name: "C-171" manufactured by Kyoto Electronics Manufacturing Co., Ltd.). A 0.5 mol/L potassium hydroxide ethanol solution was used as a titrant.

(Weight Average Molecular Weight of Crystalline Polyester Resin)

The resin particle formed from the crystalline polyester resin was precipitated by using a 1.0 mol/L hydrochloric acid aqueous solution, thoroughly washed with water and then dried at 60° C. The obtained dried product was added to tetrahydrofuran and the crystalline polyester resin was dissolved at 25° C. for 24 hours, followed by filtration through a membrane filter to obtain a measurement sample. The content of the resin in the measurement sample was adjusted to about 0.3%. The prepared measurement sample was analyzed by gel permeation chromatography under the following conditions, and the weight average molecular weight was calculated by using a molecular weight calibration curve prepared using standard polystyrene resins. As the standard polystyrene resins, the product names "TSK Standard Polystyrene F-850, F-450, F-288, F-128, F-80, F-40, F-20, F-10, F-4, F-2, F-1, A-5000, A-2500, A-1000 and A-500" (manufactured by Tosoh Corporation) were used.

HPLC device: the product name "2695 Separations Module" (manufactured by Waters)

Differential refractive index (RI) detector: the product name "2414 detector" (manufactured by Waters)

Column: Quadruple column under the product name "GPC KF-806M" (manufactured by Showa Denko K. K.)

Eluent: Tetrahydrofuran

Flow rate: 1.0 mL/min

Oven temperature: 40° C.

Sample injection volume: 100 μL (Judgment of Whether Sample is Particle or not and Particle Diameter)

The liquid containing the sample was diluted with pure water to obtain a measurement sample in which the content of the sample was adjusted to about 1.0%. Then, the particle diameters ($D_{50R}$, $D_{90R}$) of the resin particle and the particle diameter ($D_{50C}$) of the coloring material-particle in the measurement sample were measured by using a particle size analyzer. The measurement conditions in this case are presented below. As the particle size analyzer, a particle size distribution analyzer (product name "Nanotrack WAVEII-Q" manufactured by MicrotracBEL Corp.) using dynamic light scattering was used. When the particle with a particle diameter was measured in the above method, the sample was judged as "particle" ("aqueous dispersion"), and when the particle with a particle diameter was not measured, the sample was judged as "non-particle" ("aqueous solution").

[Measurement Conditions]

Number of measurements: 10

Measurement time: 120 seconds

Shape: Spherical

Refractive index: 1.5

Density: 1.0

<Synthesis of Polyester Resin>

A reaction vessel including a stirrer, a capacitor and a thermometer was prepared. A mixture of a polyhydric alcohol and a polycarboxylic acid(s) of kinds and amounts (unit: parts) presented in Table 1 was placed in this reaction vessel. Furthermore, after tetra-n-butyl titanate in an amount of 200 ppm based on the total amount of the polyhydric alcohol and the polycarboxylic acid was added as a catalyst, esterification reaction was carried out by raising the temperature to 240° C. over 4 hours. After the pressure in the system was reduced to 26 Pa over 20 minutes, the conditions at 240° C. and the reduced pressure of 26 Pa were maintained for a reaction time presented in Table 1 to polymerize a resin having a weight average molecular weight of 25,000. The conditions were returned to 25° C. and the atmospheric pressure, and then the content was pulverized with a crusher to obtain a polyester resin. The physical properties of each of the obtained polyester resins are presented in Table 1. Among the obtained polyester resins, the polyester resins 1 to 16 each having a melting point are crystalline polyester resins and the polyester resin 17 not having a melting point is an amorphous polyester resin. The meanings of abbreviations of the components in Table 1 are presented below.

DDD: 1,12-dodecanediol

DD: 1,10-decanediol

HD: 1,6-hexanediol

BD: 1,4-butanediol

NPG: neopentyl glycol

DDA: dodecanedioic acid

SEA: sebacic acid

ADA: adipic acid

SUA: succinic acid tPA: terephthalic acid iPA: isophthalic acid

TABLE 1

| | Synthesis Conditions and Physical Properties of Polyester Resins | | | | | | | | | | | | | |
| | Synthesis Conditions | | | | | | | | | | | Physical Properties | | |
| | Polyhydric Alcohol | | | | | Polycarboxylic Acid | | | | | | | Weight | |
| Polyester Resin | DDD | DD | HD | BD | NPG | DDA | SEA | ADA | SUA | tPA | iPA | Reaction Time (min) | Acid Value (mgKOH/g) | Average Molecular Weight | Melting Point (° C.) |
| 1 | | 85 | | | | 115 | | | | | | 90 | 22 | 25,000 | 65 |
| 2 | | 64 | | 136 | | | | | | | | 90 | 22 | 25,000 | 80 |

TABLE 1-continued

Synthesis Conditions and Physical Properties of Polyester Resins

| | Synthesis Conditions | | | | | | | | | | | | Physical Properties | | |
| --- | --- | --- | --- | --- | --- | --- | --- | --- | --- | --- | --- | --- | --- | --- | --- |
| Polyester | Polyhydric Alcohol | | | | | Polycarboxylic Acid | | | | | | Reaction Time | Acid Value | Weight Average Molecular | Melting Point |
| Resin | DDD | DD | HD | BD | NPG | DDA | SEA | ADA | SUA | tPA | iPA | (min) | (mgKOH/g) | Weight | (° C.) |
| 3 | | 70 | | | | 130 | | | | | | 90 | 22 | 25,000 | 70 |
| 4 | | 95 | | | | | | | 105 | | | 90 | 22 | 25,000 | 60 |
| 5 | 112 | | | | | | | 88 | | | | 90 | 22 | 25,000 | 85 |
| 6 | | 105 | | | | | | 95 | | | | 90 | 22 | 25,000 | 75 |
| 7 | | | | 70 | | 130 | | | | | | 90 | 23 | 25,000 | 60 |
| 8 | | | | 82 | | | 118 | | | | | 60 | 25 | 15,000 | 45 |
| 9 | | | | 82 | | | | | 118 | | | 90 | 22 | 25,000 | 50 |
| 10 | | 80 | | | | | | | 60 | | 60 | 90 | 23 | 25,000 | 140 |
| 11 | | 80 | | | | | | | 40 | | 80 | 90 | 22 | 25,000 | 150 |
| 12 | | 90 | | | | | | | 110 | | | 90 | 8 | 25,000 | 65 |
| 13 | | 90 | | | | | | | 110 | | | 60 | 10 | 15,000 | 60 |
| 14 | | 75 | | | | | | | 125 | | | 90 | 50 | 25,000 | 65 |
| 15 | | 74 | | | | | | | 126 | | | 60 | 52 | 15,000 | 60 |
| 16 | | 100 | | | | | | | 100 | | | 90 | 0 | 25,000 | 65 |
| 17 | | | 70 | | | | | | | 65 | 65 | 90 | 23 | 25,000 | — |

<Production of Resin Particle>
(Resin Particles 1 to 23, 25)

A 2 L beaker in which a stirrer (product name "Tornado Stirrer Standard SM-104" manufactured by AS ONE Corporation) was set was prepared. A polyester resin of a kind presented in Table 2 was dissolved in tetrahydrofuran heated to 45° C., and 300 parts of a resin solution with a concentration presented in Table 2 was prepared and placed in the beaker. A 5% potassium hydroxide aqueous solution in a usage amount equivalent to a neutralization rate presented in Table 2 based on the acid value of the polyester resin was added, followed by stirring for 30 minutes. Under the condition at 45° C., 300 parts of deionized water was added dropwise at a rate of 20 mL/min while stirring at a rotation rate presented in Table 2. After the organic solvent and part of the water were distilled off under reduced pressure, the content in the beaker was filtered using a 150-mesh wire mesh (a filter in which 150 stainless steel wires were woven in each of the length and width per 1 inch square). An appropriate amount of deionized water was added to adjust the content of the resin particle, and a liquid containing each of the resin particles with a content of the resin particle of 25.0% was obtained.

(Resin Particle 24)

After 300 parts of a 30% by mass resin solution prepared by dissolving the polyester resin 16 (crystalline polyester having no carboxylic acid group) in tetrahydrofuran heated to 45° C. was placed in a 2 L beaker, 9 parts of a surfactant (product name "Emal 0" (manufactured by Kao Corporation) was added, followed by stirring for 30 minutes. Further, 300 parts of deionized water heated to 45° C. was added. Using an ultrasonic irradiator (product name "S-150D Digital Sonifier" manufactured by Branson), the resultant mixture was emulsified under the conditions at 50 W and 20 kHz for 30 minutes, and then the organic solvent and part of the water were distilled off under reduced pressure. The content in the beaker was filtered using a 150-mesh wire mesh (a filter in which 150 stainless steel wires were woven in each of the length and width per 1 inch square). An appropriate amount of deionized water was added to adjust the content of the resin particle, and a liquid containing the resin particle 24 with a content of the resin particle of 25.0% was obtained.

Table 2 presents a volume-based 50% cumulative particle diameter ($D_{50R}$ (nm)) of each obtained resin particle in the liquid containing the resin particle and a value of a ratio ($D_{50R}/D_{90R}$ (times)) of the volume-based 50% cumulative particle diameter ($D_{50R}$) to a volume-based 90% cumulative particle diameter ($D_{90R}$).

TABLE 2

Production Conditions and Properties of Resin Particle

| | Production Conditions | | | | Properties | |
| --- | --- | --- | --- | --- | --- | --- |
| Resin Particle | Kind of Polyester Resin | Concentration (%) | Neutralization Rate (mol %) | Rotation Rate (rpm) | $D_{50R}$ (nm) | $D_{50R}/D_{90R}$ (times) |
| 1 | 1 | 30 | 75 | 150 | 20 | 0.7 |
| 2 | 2 | 30 | 75 | 150 | 20 | 0.7 |
| 3 | 3 | 30 | 75 | 150 | 20 | 0.7 |
| 4 | 4 | 30 | 75 | 150 | 20 | 0.7 |
| 5 | 5 | 30 | 75 | 150 | 20 | 0.7 |
| 6 | 6 | 30 | 75 | 150 | 20 | 0.7 |
| 7 | 7 | 30 | 75 | 150 | 20 | 0.7 |
| 8 | 1 | 30 | 70 | 150 | 25 | 0.7 |
| 9 | 1 | 30 | 70 | 100 | 30 | 0.7 |
| 10 | 1 | 30 | 90 | 300 | 4 | 0.7 |
| 11 | 1 | 30 | 85 | 250 | 5 | 0.7 |
| 12 | 1 | 30 | 65 | 100 | 40 | 0.7 |
| 13 | 8 | 30 | 75 | 150 | 15 | 0.7 |
| 14 | 9 | 30 | 75 | 150 | 20 | 0.7 |
| 15 | 10 | 30 | 75 | 150 | 20 | 0.7 |
| 16 | 11 | 30 | 75 | 150 | 20 | 0.7 |
| 17 | 12 | 30 | 75 | 150 | 28 | 0.7 |
| 18 | 13 | 30 | 75 | 150 | 25 | 0.7 |
| 19 | 14 | 30 | 50 | 150 | 15 | 0.7 |
| 20 | 15 | 30 | 50 | 150 | 12 | 0.7 |
| 21 | 1 | 10 | 75 | 150 | 20 | 0.5 |
| 22 | 1 | 20 | 75 | 150 | 20 | 0.6 |
| 23 | 1 | 40 | 75 | 150 | 20 | 0.8 |
| 24 | 16 | — | — | — | 400 | 0.5 |
| 25 | 17 | 40 | 90 | 300 | 20 | 0.7 |

<Production of Coloring Material-Particle>
(Coloring Material-Particles 1, 2 and 6 to 13)

In a batch-type vertical sand mill (manufactured by AIMEX CO., Ltd) filled with 200 parts of zirconia beads with a diameter of 0.3 mm, a mixture of 10.0 parts of a colorant of a kind presented in Table 3, 20.0 parts of a liquid containing a resin, and 70.0 parts of deionized water was placed, and dispersion processing was performed for a dispersion time presented n Table 3. As the liquid containing the resin, an aqueous solution in which a water-soluble resin was dissolved in a potassium hydroxide aqueous solution in an equimolar amount corresponding to an acid value of the resin and the content of the resin was 30.0% was used. This water-soluble resin is a styrene-ethyl acrylate-acrylic acid copolymer with an acid value of 167 mgKOH/g and a weight average molecular weight of 10,000. After coarse particle was removed by centrifugation, pressure filtration was performed with a microfilter (manufactured by FUJIFILM Corporation) with a pore size of 3.0 μm. An appropriate amount of deionized water was added to adjust the concentration, and thus a liquid containing each of the coloring material-particles with a content of the coloring material-particle (resin-dispersed pigment) of 10.0% was obtained. The meanings of the components in Table 3 are presented below.

NIPex90: Carbon black (manufactured by Orion Engineered Carbons)

5GX01: C.I. Pigment Yellow 74 (product name: "Hansa yellow 5GX 01 LV 3344" manufactured by Clariant)

(Coloring Material-Particle 3)

After a solution was prepared by dissolving 5.0 g of concentrated hydrochloric acid in 5.5 g of water and then cooled to 5° C., 1.6 g of 4-aminophthalic acid was added under the above condition. A container containing this solution was placed in an ice bath and a solution obtained by dissolving 1.8 g of sodium nitrite in 9.0 g of ion-exchanged water at 5° C. was added while the solution was stirred to keep the temperature of 10° C. or lower. After stirring for 15 minutes, 6.0 g of carbon black (product name "NIPex90" manufactured by Orion Engineered Carbons) was added with stirring. A slurry was obtained by additional stirring for 15 minutes. The obtained slurry was filtered through a filter paper (product name "Standard Filter Paper No. 2" manufactured by Advantech) and the particle was thoroughly washed with water and dried in an oven at 110° C. After that, the sodium ions were replaced with potassium ions by an ion exchange method to obtain a liquid containing a self-dispersible pigment that is coloring material-particle in which —$C_6H_3$—$(COOK)_2$ groups were bonded to the particle surfaces of the carbon black. An appropriate amount of deionized water was added to adjust the content of the coloring material-particle, and thus a liquid containing the coloring material-particle 3 with a content of the coloring material-particle (self-dispersible pigment) of 10.0% was obtained.

(Coloring Material-Particle 4)

A 2 L beaker in which a stirrer (product name "Tornado Stirrer Standard SM-104" manufactured by AS ONE Corporation) was set was prepared. In this beaker, 300 parts of a 30% tetrahydrofuran solution of a styrene-ethyl acrylate-acrylonitrile-acrylic acid copolymer having an acid value of 60 mgKOH/g and a weight average molecular weight of 10,000 and 9 parts of C.I. Basic Red 1 were placed and stirred for 30 minutes. Then, a 5% sodium hydroxide aqueous solution was added in an amount equivalent to 50 mol % based on the acid value of the copolymer, and the mixture was stirred for 30 minutes. While stirring, 300 parts of deionized water was added dropwise at a rate of 20 mL/min. After the organic solvent and part of the water were distilled off under reduced pressure, the content in the beaker was filtered using a 150-mesh wire mesh (a filter in which 150 stainless steel wires were woven in each of the length and width per 1 inch square). An appropriate amount of deionized water was added to adjust the concentration, and thus a liquid containing the coloring material-particle 4 with a content of the coloring material-particle (resin particle dyed with the dye) of 10.0% was obtained.

(Coloring Material-Particle 5)

In a 2 L beaker, 300 parts of a 30% methyl ethyl ketone solution of a styrene-ethyl acrylate-acrylonitrile-acrylic acid copolymer having an acid value of 60 mgKOH/g and a weight average molecular weight of 10,000 was placed. Then, a mixture of 9 parts of C.I. Basic Red 1, a 5% sodium hydroxide aqueous solution in an amount equivalent to 50 mol % based on the acid value of the copolymer and 300 parts of deionized water was added. Using an ultrasonic irradiator (product name "S-150D Digital Sonifier" manufactured by Branson), the resultant mixture was emulsified under the conditions at 50 W and 20 kHz for 30 minutes, and then the organic solvent and part of the water were distilled off under reduced pressure. The content in the beaker was filtered using a 150-mesh wire mesh (a filter in which 150 stainless steel wires were woven in each of the length and width per 1 inch square). An appropriate amount of deionized water was added to adjust the concentration, and thus a liquid containing the coloring material-particle 5 with a content of the coloring material-particle (dye dispersed with the resin) of 10.0% was obtained.

Table 3 presents a 50% cumulative particle diameter ($D_{50C}$) in the volume-based particle size distribution of each of the obtained coloring material-particles in the liquid containing the coloring material-particle.

TABLE 3

| Production Conditions and Properties of Coloring Material-Particle | | | | |
|---|---|---|---|---|
| Coloring | Production Conditions | | Properties | |
| Material-Particle | Colorant | Dispersion Time (hour) | $D_{50C}$ (nm) | Type of Colorant |
| 1 | NIPex90 | 3.0 | 100 | Resin-dispersed Pigment |
| 2 | 5GX01 | 3.0 | 110 | Resin-dispersed Pigment |
| 3 | NIPex90 | 3.0 | 90 | Self-Dispersible Pigment |
| 4 | C.I. Basic Red 1 | — | 100 | Resin Particle Dyed with Dye |
| 5 | C.I. Basic Red 1 | — | 80 | Dye Dispersed with Resin |
| 6 | NIPex90 | 10.0 | 35 | Resin-dispersed Pigment |
| 7 | NIPex90 | 0.5 | 180 | Resin-dispersed Pigment |
| 8 | NIPex90 | 2.5 | 120 | Resin-dispersed Pigment |

TABLE 3-continued

| Coloring Material-Particle | Colorant | Dispersion Time (hour) | $D_{50C}$ (nm) | Type of Colorant |
|---|---|---|---|---|
| 9 | NIPex90 | 2.0 | 130 | Resin-dispersed Pigment |
| 10 | NIPex90 | 10.0 | 35 | Resin-dispersed Pigment |
| 11 | NIPex90 | 8.0 | 40 | Resin-dispersed Pigment |
| 12 | NIPex90 | 1.5 | 150 | Resin-dispersed Pigment |
| 13 | NIPex90 | 1.0 | 160 | Resin-dispersed Pigment |

<Preparation of Ink>

Examples 1 to 39 and Comparative Examples 1 to 5

The components specified below were mixed, thoroughly stirred, and pressure-filtered through a microfilter with a pore size of 2.5 μm to prepare an ink. Among the components specified below, "ACETYLENOL E100" is a product name of a nonionic surfactant (manufactured by Kawaken Fine Chemicals Co., Ltd.). Tables 4-1 and 4-2 present the physical properties of the inks.

Liquid containing resin particle: amount leading to a resin particle content R (%) presented in Tables 4-1 and 4-2

Liquid containing coloring material-particle: amount leading to a coloring material-particle content C (%) presented in Tables 4-1 and 4-2

Glycerin: 5.00%

Triethylene glycol: 10.00%

ACETYLENOL E100: 0.10%

Ion-exchanged water: Balance (%) for making the total of the components equal to 100.00%

Comparative Example 6

A "pigment-containing polymer particle" and "Em4-1" described in Japanese Patent Application Laid-Open No. 2014-125555 were prepared. Then, the components specified below were mixed, thoroughly stirred, and pressure-filtered through a microfilter with a pore size of 2.5 μm to prepare an ink. Table 4-2 presents the physical properties of the ink.

Em4-1: 0.40%

Pigment-containing polymer particle: 4.00%

Glycerin: 5.00%

Triethylene glycol: 10.00%

ACETYLENOL E100: 0.10%

Ion-exchanged water: Balance (%) for making the total of the components equal to 100.00%

TABLE 4

Compositions and Physical Properties of Inks

| | | Resin Particle | | Coloring material-particle | | C/R | Physical Properties | | |
|---|---|---|---|---|---|---|---|---|---|
| | | Kind | Content R (%) | Kind | Content C (%) | Value (times) | $D_{50R}$ (nm) | $D_{50C}$ (nm) | $D_{50C}-D_{50R}$ (nm) |
| Example | 1 | 1 | 0.40 | 1 | 4.00 | 10.0 | 20 | 100 | 80 |
| | 2 | 1 | 0.40 | 2 | 4.00 | 10.0 | 20 | 110 | 90 |
| | 3 | 1 | 0.40 | 3 | 4.00 | 10.0 | 20 | 90 | 70 |
| | 4 | 1 | 0.40 | 4 | 4.00 | 10.0 | 20 | 100 | 80 |
| | 5 | 1 | 0.40 | 5 | 4.00 | 10.0 | 20 | 80 | 60 |
| | 6 | 2 | 0.40 | 1 | 4.00 | 10.0 | 20 | 100 | 80 |
| | 7 | 3 | 0.40 | 1 | 4.00 | 10.0 | 20 | 100 | 80 |
| | 8 | 4 | 0.40 | 1 | 4.00 | 10.0 | 20 | 100 | 80 |
| | 9 | 5 | 0.40 | 1 | 4.00 | 10.0 | 20 | 100 | 80 |
| | 10 | 6 | 0.40 | 1 | 4.00 | 10.0 | 20 | 100 | 80 |
| | 11 | 7 | 0.40 | 1 | 4.00 | 10.0 | 20 | 100 | 80 |
| | 12 | 8 | 0.40 | 6 | 4.00 | 10.0 | 25 | 35 | 10 |
| | 13 | 9 | 0.40 | 7 | 4.00 | 10.0 | 30 | 180 | 150 |
| | 14 | 1 | 0.40 | 7 | 4.00 | 10.0 | 20 | 180 | 160 |
| | 15 | 1 | 0.40 | 8 | 4.00 | 10.0 | 20 | 120 | 100 |
| | 16 | 1 | 0.40 | 9 | 4.00 | 10.0 | 20 | 130 | 110 |
| | 17 | 10 | 0.40 | 1 | 4.00 | 10.0 | 4 | 100 | 96 |
| | 18 | 11 | 0.40 | 1 | 4.00 | 10.0 | 5 | 100 | 95 |
| | 19 | 9 | 0.40 | 1 | 4.00 | 10.0 | 30 | 100 | 70 |
| | 20 | 12 | 0.40 | 1 | 4.00 | 10.0 | 40 | 100 | 60 |
| | 21 | 1 | 0.02 | 1 | 4.00 | 200.0 | 20 | 100 | 80 |
| | 22 | 1 | 0.04 | 1 | 4.00 | 100.0 | 20 | 100 | 80 |
| | 23 | 1 | 4.00 | 1 | 4.00 | 1.0 | 20 | 100 | 80 |
| | 24 | 1 | 5.00 | 1 | 4.00 | 0.8 | 20 | 100 | 80 |
| | 25 | 13 | 0.40 | 1 | 4.00 | 10.0 | 15 | 100 | 85 |
| | 26 | 14 | 0.40 | 1 | 4.00 | 10.0 | 20 | 100 | 80 |

TABLE 4-continued

Compositions and Physical Properties of Inks

| | | Composition | | | | | | | |
| | | Resin Particle | | Coloring material-particle | | | | | |
| | | | Content | | Content | C/R | | Physical Properties | |
| | Kind | R (%) | Kind | C (%) | Value (times) | $D_{50R}$ (nm) | $D_{50C}$ (nm) | $D_{50C}$-$D_{50R}$ (nm) |
|---|---|---|---|---|---|---|---|---|
| | 27 | 15 | 0.40 | 1 | 4.00 | 10.0 | 20 | 100 | 80 |
| | 28 | 16 | 0.40 | 1 | 4.00 | 10.0 | 20 | 100 | 80 |
| | 29 | 17 | 0.40 | 1 | 4.00 | 10.0 | 28 | 100 | 72 |
| | 30 | 18 | 0.40 | 1 | 4.00 | 10.0 | 25 | 100 | 75 |
| | 31 | 19 | 0.40 | 1 | 4.00 | 10.0 | 15 | 100 | 85 |
| | 32 | 20 | 0.40 | 1 | 4.00 | 10.0 | 12 | 100 | 88 |
| | 33 | 21 | 0.40 | 1 | 4.00 | 10.0 | 20 | 100 | 80 |
| | 34 | 22 | 0.40 | 1 | 4.00 | 10.0 | 20 | 100 | 80 |
| | 35 | 23 | 0.40 | 1 | 4.00 | 10.0 | 20 | 100 | 80 |
| | 36 | 1 | 0.40 | 10 | 4.00 | 10.0 | 20 | 35 | 15 |
| | 37 | 1 | 0.40 | 11 | 4.00 | 10.0 | 20 | 40 | 20 |
| | 38 | 1 | 0.40 | 12 | 4.00 | 10.0 | 20 | 150 | 130 |
| | 39 | 1 | 0.40 | 13 | 4.00 | 10.0 | 20 | 160 | 140 |
| Comparative Example | 1 | 1 | 0.40 | C.I. Direct Black 195 | 4.00 | 10.0 | 20 | — | — |
| | 2 | — | 0.00 | 1 | 4.00 | — | — | 100 | — |
| | 3 | 24 | 0.40 | 1 | 4.00 | 10.0 | 400 | 100 | -300 |
| | 4 | 25 | 0.40 | 1 | 4.00 | 10.0 | 20 | 100 | 80 |
| | 5 | 9 | 0.40 | 6 | 4.00 | 10.0 | 30 | 35 | 5 |
| | 6 | Em4-1 | 0.40 | Pigment-Containing Polymer Particle | 4.00 | 10.0 | 127 | 133 | 6 |

<Evaluation>

In the present invention, in the following evaluation criteria for each of items, "A" and "B" were defined as tolerable levels and "C" was defined as an intolerable level. In addition, when a clear difference was recognized even within the same evaluation criterion, an inferior one in "A" was expressed as "A⁻" and an inferior one in "B" was expressed as "B⁻". Table 5 presents the evaluation results.

(Chemical Resistance)

An ink cartridge was filled with each prepared ink, and mounted on an ink jet recording apparatus (product name "'PIXUS iP3100'" manufactured by Canon Inc.) that ejects ink from a recording head by the action of thermal energy. In Examples, a recording duty of a solid image recorded under the conditions where one ink droplet of 5 pL per droplet is applied to a unit area of 1/1,200 inch×1/1,200 inch was defined as 100%. Using this ink jet recording apparatus, a solid image in 200 mm×200 mm at the recording duty of 100% was recorded on a recording medium (product name "aurora coat" manufactured by Nippon Paper Industries Co., Ltd.). After the recorded image was dried at 25° C. for 24 hours, the recorded image was heated at 100° C. for 5 minutes using a heating oven. After the temperature of the image after heating was returned to 25° C. 0.1 g of a 70% ethanol aqueous solution was put on the image for one minute, and thereafter was wiped off with a cellulose non-woven fabric, and the chemical resistance of the image was evaluated according to the following evaluation criteria.

A: No droplet marks remained on the image.

B: The ratio of the area of the exposed recording medium to the area smeared with the droplets was less than 5%.

C: The ratio of the area of the exposed recording medium to the area smeared with the droplets was 5% or more.

(Image Clarity)

Using the aforementioned ink jet recording apparatus, a solid image in 2 cm×2 cm at the recording duty of 100% was recorded on a recording medium (product name "Canon Photo Paper, Glossy Gold GL-101" manufactured by Canon Inc.). After the recorded image was dried at 25° C. for 24 hours, the recorded image was illuminated at an angle of 45 degrees from a distance of 2 m using two fluorescent lamps arranged in parallel with an interval of 10 cm (illumination angle of 45 degrees). The shapes of the fluorescent lamps projected onto the image were visually checked from an angle of 45 degrees (observation angle of 45 degrees), and the image clarity of the image was evaluated according to the following evaluation criteria.

A: The borderline between the projected two fluorescent lamps was recognized and no blur was observed on the edges.

B: The borderline between the projected two fluorescent lamps was recognized and slight blur was observed on the edges.

C: The borderline between the projected two fluorescent lamps was not recognized.

TABLE 5

Evaluation Results of Inks

| | | Chemical Resistance | Image Clarity |
|---|---|---|---|
| Example | 1 | A | A |
| | 2 | A | A |
| | 3 | A | A |
| | 4 | A | A |
| | 5 | A | A |
| | 6 | A | A |
| | 7 | A | A |

27

TABLE 5-continued

Evaluation Results of Inks

| | | Chemical Resistance | Image Clarity |
|---|---|---|---|
| | 8 | A | A |
| | 9 | A | A |
| | 10 | A | A |
| | 11 | A | A |
| | 12 | B | A |
| | 13 | A− | B |
| | 14 | B− | B |
| | 15 | A | A |
| | 16 | A− | A |
| | 17 | B | A |
| | 18 | A | A |
| | 19 | A | A |
| | 20 | A | B |
| | 21 | B | A |
| | 22 | A | A |
| | 23 | A | A |
| | 24 | B | A |
| | 25 | B | A |
| | 26 | A | A |
| | 27 | A | A− |
| | 28 | A | B− |
| | 29 | A | B |
| | 30 | A | A |
| | 31 | A | A |
| | 32 | A | B |
| | 33 | A | B |
| | 34 | A | A |
| | 35 | A | A |
| | 36 | B | A |
| | 37 | A | A |
| | 38 | A− | A |
| | 39 | A− | B |
| Comparative Example | 1 | C | A |
| | 2 | C | A |
| | 3 | C | C |
| | 4 | C | B− |
| | 5 | C | C |
| | 6 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198803, filed Dec. 7, 2021, and Japanese Patent Application No. 2022-169856, filed Oct. 24, 2022, which are hereby incorporated by reference herein in their entirety.

28

What is claimed is:

1. An aqueous ink for ink jet comprising a coloring material-particle and a resin particle,
   wherein the resin particle is formed of a crystalline polyester resin having a carboxylic acid group; and
   wherein a difference (D50C−D50R) of a 50% cumulative particle diameter (D50C) in a volume-based particle size distribution of the coloring material-particle minus a 50% cumulative particle diameter (D50R) in a volume-based particle size distribution of the resin particle is 10 nm or more.

2. The aqueous ink according to claim 1, wherein the D50C−D50R is 150 nm or less.

3. The aqueous ink according to claim 1, wherein the D50C−D50R is 100 nm or less.

4. The aqueous ink according to claim 1, wherein the D50R is 5 nm or more to 30 nm or less.

5. The aqueous ink according to claim 1, wherein a ratio of the D50R to a 90% cumulative particle diameter (D90R) in the volume-based particle size distribution of the resin particle is 0.6 times or more.

6. The aqueous ink according to claim 1, wherein a mass ratio of a content (% by mass) of the coloring material-particle to a content (% by mass) of the resin particle is 1.0 times or more to 100.0 times or less.

7. An ink cartridge comprising an ink and an ink storage portion that stores the ink therein, wherein the ink comprises the aqueous ink according to claim 1.

8. The ink cartridge according to claim 7, wherein the D50C−D50R is 150 nm or less.

9. The ink cartridge according to claim 7, wherein the D50C−D50R is 100 nm or less.

10. The ink cartridge according to claim 7, wherein the D50R is 5 nm or more to 30 nm or less.

11. The ink cartridge according to claim 7, wherein a ratio of the D50R to a 90% cumulative particle diameter (D90R) in the volume-based particle size distribution of the resin particle is 0.6 times or more.

12. The ink cartridge according to claim 7, wherein a mass ratio of a content (% by mass) of the coloring material-particle to a content (% by mass) of the resin particle is 1.0 times or more to 100.0 times or less.

13. An ink jet recording method comprising recording an image onto a recording medium by ejecting an ink from an ink jet recording head, wherein the ink comprises the aqueous ink according to claim 1.

* * * * *